United States Patent
Chaudhuri et al.

(10) Patent No.: US 6,587,235 B1
(45) Date of Patent: Jul. 1, 2003

(54) METHOD AND APPARATUS FOR CAPACITY-EFFICIENT RESTORATION IN AN OPTICAL COMMUNICATION SYSTEM

(75) Inventors: Sid Chaudhuri, East Brunswick, NJ (US); Bruce Gilbert Cortez, Marlboro, NJ (US); Simon S. Zelingher, Morganville, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/464,397

(22) Filed: Dec. 16, 1999

(51) Int. Cl.[7] .............................................. H04B 10/08
(52) U.S. Cl. ........................ 359/110; 359/119; 359/117; 359/128; 359/139; 359/124; 359/127; 385/16; 385/17; 385/24; 370/228; 370/225; 370/216
(58) Field of Search ................................. 359/110, 119, 359/128, 127, 117, 139, 124; 385/24, 16, 17; 370/228, 216, 217, 225, 227, 221, 242

(56) References Cited

U.S. PATENT DOCUMENTS

| | | | |
|---|---|---|---|
| 5,029,158 A | * | 7/1991 | Reid et al. .................. 370/13.1 |
| 5,647,035 A | | 7/1997 | Cadeddu et al. |
| 5,760,934 A | | 6/1998 | Sutter et al. |
| 5,884,017 A | | 3/1999 | Fee |
| 5,896,474 A | | 4/1999 | Van Deventer et al. |
| 5,903,370 A | | 5/1999 | Johnson |
| 6,061,482 A | * | 5/2000 | Davis .......................... 385/17 |
| 6,130,876 A | * | 10/2000 | Chaudhuri .................. 370/228 |
| 6,400,477 B1 | * | 6/2002 | Wellbrook .................. 359/117 |

* cited by examiner

Primary Examiner—Leslie Pascal
Assistant Examiner—Hanh Phan

(57) ABSTRACT

A method and system provide capacity-efficient restoration within an optical fiber communication system. The system includes a plurality of nodes each interconnected by optical fibers. Each optical fiber connection between nodes includes at least three channel groups with different priority levels for restoration switching in response to a connection failure. The system maintains and restores full-capacity communication services by switching at least a portion of the channel groups from a first optical fiber connection to a second optical fiber connection system based on the priority levels assigned to the channel groups. Service reliability is effectively maintained without incurring additional costs for dedicated spare optical fiber equipment by improving idle capacity utilization.

14 Claims, 4 Drawing Sheets

METHOD AND APPARATUS FOR CAPACITY-EFFICIENT RESTORATION IN AN OPTICAL COMMUNICATION SYSTEM

BACKGROUND OF THE INVENTION

1. Field of the Invention

The present invention relates generally to optical communication systems. It particularly relates to a capacity-efficient restoration architecture for an optical communication system.

2. Background Art

The operations, administration, maintenance, and provisioning of optical fiber communication systems are described in the Synchronous Optical Network/Synchronous Digital Hierarchy (SONET/SDH) standards as specified by American National Standards Institute (ANSI) and International Telecommunication Union—Telecommunication Standardization Sector (ITU-T). SDH is specified in ITU-T G.707 Recommendation, Network node interface for the SDH.

Typical optical fiber communication systems comprise a combination of transmitters, receivers, optical combiners, optical fibers, optical amplifiers, optical connectors, and splitters. Wavelength Division Multiplexing (WDM) or Dense Wavelength Division Multiplexing (DWDM) systems also comprise couplers to enable multiple wavelength transmission over the same optical fiber. Typical optical system configurations include mesh networks and ring networks. Ring networks commonly comprise two fiber pairs connecting a plurality of nodes in a loop. One fiber pair carries bi-directional aggregate traffic between pairs of nodes in the ring. The second fiber pair is used to re-route traffic when there is a failure in the ring on a shared basis. A two-fiber ring is also available in which half the capacity within a fiber is reserved for traffic restoration. Mesh networks commonly comprise a plurality of nodes wherein a node can be connected to more than two nodes in the network enabling enhanced network reliability and higher capacity efficiency when a link failure occurs.

Optical fibers carry far greater amounts of information than carried by other communication media (e.g., electrical cables). Under the Synchronous Optical Network (SONET') standard, the commonly used OC-48 protocol operates at 2.488 Gbps supporting a capacity equivalent to over 32,000 voice circuits. The next highest protocol, OC-192, operates at 9.953 Gbps supporting a capacity equivalent to over 128,000 voice circuits. Therefore, robustness and reliability is required from such high-capacity, long-haul systems. Indeed, most Transatlantic cable systems (TAT), undersea systems which carry international telecommunication traffic, are required to have at least 25 year reliability.

However, since reliability is never absolute most optical systems require a restoration scheme to maintain some level of system performance despite fiber outages, amplifier failures, and some other equipment failure. Several common restoration schemes commercially used include those specified in the SONET standard in a point-to-point single link configuration or a ring network configuration.

Examples of these standardized traditional protection schemes are shown in FIGS. 1, 2. Particularly, FIG. 1 shows a typical one-line point-to-point 1:1 protection system in a Dense Wavelength Division Multiplexing (DWDM) scheme wherein nodes A, B are linked nodes within an optical fiber communication system. The system shown operates in accordance with the SONET/SDH standard, the standard for synchronous data transmission on optical media.

The protection system architecture 100 includes protection switches 110, 190, working and protection link 150, and dense wavelength division multiplexers (DWDMs) 120, 160. Working and protection link 150 commonly comprises a single or multiple (cable bundle of fibers) optical fiber connection between nodes A, B. Protection switches 110, 190 commonly comprise optical-to-electrical transducers and/or optical layer cross-connection switches that provide communication service connectivity between the protection system 100 and other communication devices (e.g., customer premises equipment). There exists a one-to-one correspondence between working channels (lines) 130, 170 and protection channels (lines) 140, 180. However, both working and protection channels 130, 170, 140, 180 are multiplexed by the DWDMs on to a single optical fiber connection between DWDMs 120, 160 for one direction (e.g., A to B). Another corresponding fiber is typically used for the other direction traffic from B to A.

In response to a failure in the transmitter or receiver or cabling for a working line, the SONET/SDH signals carried by working lines 130, 170 are switched from the working lines 130, 170 to the protection lines 140, 180 by protection switches 110, 190. However, since both working lines 130, 170 and protection lines 140, 180 are carried by the same working and protection link 150, a fiber cut in link 150 or a failure in DWDMs 120, 160 or in an optical amplifier for link 150 completely terminates optical communication services between nodes A, B over link 150. To resume service, alternate routing (not shown) would be necessary that can be accomplished through ring switch or mesh restoration means.

FIG. 2 shows the same protection configuration but now with a two-line point-to-point 1:1 protection architecture 200. The protection system architecture 200 includes protection switches 210, 295 working link 250 and protection link 260, and DWDMs 220, 270. DWDMs 220, 270 multiplex working lines 230, 280 and protection lines 240, 290 on to separate working link 250 and protection link 260 between nodes A, B.

For this protection scheme, in response to a failure in the transmitter or receiver or cabling for a working line as well as an optical amplifier or DWDM failure, the SONET/SDH signals carried by working lines 230, 280 are switched from the working lines 230, 280 to the protection lines 240, 290 by protection switches 210, 295. However, again, to resume service when both working and protection links 250, 260 both fail or are cut because the fibers in lines 250 and 260 are in the same cable, alternate routing (not shown) would be necessary that can be accomplished through ring switch or mesh restoration means.

Both 1-line or 2-line 1:1 DWDM systems shown in FIGS. 1, 2 are inefficient in terms of utilization of protection capacity. Both systems use 100% idle capacity that either does not generate any revenue or provides low-grade service on the protection lines. This low-grade service can be preempted when there is a failure of the primary revenue-generating service.

FIGS. 3, 4 again show a commonly-used optical restoration system architecture that provides communication services in accordance with the SONET standard. Particularly, FIG. 3 shows a one-line 1:N protection system using DWDM. The protection system architecture 300 includes protection switches 310, 390 working and protection link 350, and DWDMs 340, 360. Nodes A, B within the system are interconnected by working and protection link 350. In the 1:N protection scheme, there is one dedicated protection channel (line) 330, 380 for each group of N (N>1) working channels (lines) 320, 370. A typical example may be ten groups of 4 (N=4) working channels therein resulting in 10 protection channels for a total number of 40 working channels. In the illustrative example shown in FIG. 2(a), a transmitter/receiver failure on one of a group of N working channels 320, 370 is protected by switching to a protection channel 330, 380 dedicated for that group. Again, due to the one-line scheme for working and protection link 350, an optical amplifier failure or fiber cut results in a termination of communication services between nodes A, B over link 350. Working channels 320, 370 must be re-routed using a ring or mesh restoration network (not shown).

Similarly, FIG. 4 shows a two-line 1:N (N>1) protection system using DWDM. The protection system architecture 400 includes protection switches 410, 495 working link 450 and protection link 460, and DWDMs 440, 470. Nodes A, B within the system are interconnected by working link 450 and protection link 460. For a DWDM or optical amplifier failure, or fiber cut even in a two-line DWDM configuration, (N−1) channels from each group of N working channels 420 will not be restored. Therefore, in our current example assuming ten groups of 4 (N=4) working channels, there are only 10 restoration channels resulting in 30 channels [(N−1)*10] not being restored.

Additionally, even a 2-line 1:N protection using DWDM does not efficiently utilize idle capacity. When the working DWDM link 450 is used to its maximum capacity, only 1/N fraction (e.g., ¼ fraction for current example) of the working channels 420 is used in the protection DWDM link 460 thereby not utilizing the protection DWDM link 460 to its maximum capacity. Therefore, the two-line 1:N protection system inefficiently utilizes the capacity of the protection link although it is more capacity-efficient than the two-line 1:1 protection system which has 100% idle capacity. However, the two-line 1:1 protection system offers better reliability as all working channels in the failed working link will be effectively switched to the idle protection link as contrasted to the 1/N protection capability of the two-line 1:N system.

Another category of restoration schemes include systems which are not confined to a single link. These systems include Bi-directional line switched rings (BLSR) and mesh restoration. These systems have the advantage that the protection capacity is utilized on a shared basis for failures in multiple links within the ring. Particularly, BLSRs typically comprise four fiber rings wherein traffic in one direction travels on one fiber pair while traffic in the opposite direction travels on the other fiber pair. This scheme uses 1:1 configuration for each link of the ring, but the same protection lines of the links of a ring are also used for protection against a fiber cut type of failure when both working and protection lines of another link fail. For failures which affect only the working channel on a route, the signal is protected by using the 1:1 protection scheme previously described. For failures that affect both the working and protection lines of a route, the signal is restored using the protection line carrying traffic traveling around the other direction of the system. The same protection line is used on a shared basis when both working and protection channels fail anywhere within the ring. It would require much more capacity to provide similar reliability as a BLSR against fiber cuts using a 1:1 protection scheme. In the 1:1 scheme, the working line and the protection line between any pair of protection switch systems need to be routed via DWDMs in the opposite directions in the loop.

However, the BLSR system still does not offer the most capacity efficient network when typically there are more than two fiber routes at most of the nodes. This system is limited to particular applications and to only two types of service grades due to the two-fiber architecture. These two grades are the fully-protected service on the working channels in a fiber or the pre-emptable service carried by the protection channels.

A mesh restoration scheme offers some additional advantage by sharing the protection capacity more efficiently than BLSR. Mesh restoration offers 1-line or 2-line 1:1 protection for each link or some mesh restoration architectures use a 1:N protection scheme for each link. The protection channels are also used for restoration against a link failure. Again, 1:1 protection makes inefficient use of protection capacity while 1:N protection offers lower reliability for working channels or poor utilization of DWDM capacity in 2-line 1:N protection configuration.

In view of the above, there is a need to maintain capacity without incurring additional costs when restoring optical communication links. Idle capacity utilization needs to be improved while providing multiple grades of protection (varying priority levels) for different type of communication services. Due to the disadvantages of prior restoration techniques, there is a need to restore communication links and paths while still limiting costs and still maintaining capacity. The present invention describes such a capacity-efficient restoration architecture that dynamically restores failed optical communication links without incurring costs from idle protection links while still maintaining the same capacity or in some instances actually improving capacity from the failed link.

SUMMARY OF THE INVENTION

The present invention overcomes the previously mentioned disadvantages by using a hybrid protection architecture for an optical communication system comprising a plurality of interconnected nodes. The protection scheme uses a two-line optical fiber connection for each link between nodes but is not 1:1 protection. At least three channel groups are carried by each line wherein each channel group is assigned a different priority level for restoration. In response to a failure on a line, channels are switched in descending priority level to available restoration channels on another line or link to maintain optical communication services connectivity.

DETAILED DESCRIPTION

The present invention provides a hybrid protection architecture to efficiently restore optical communication services within an optical communication system. The optical communication system preferably operates using the SONET/SDH standard. Therefore, it is noted that particular non-critical aspects of the standard and optical communication system are not described in great detail as they are not critical to the present invention and these aspects are well-known in the relevant field of invention. Also, it is noted that those skilled in the art will appreciate that the present invention may be equally applied to any optical communication system topology that comprises a plurality of interconnected nodes utilizing any communication format.

Figure 5:
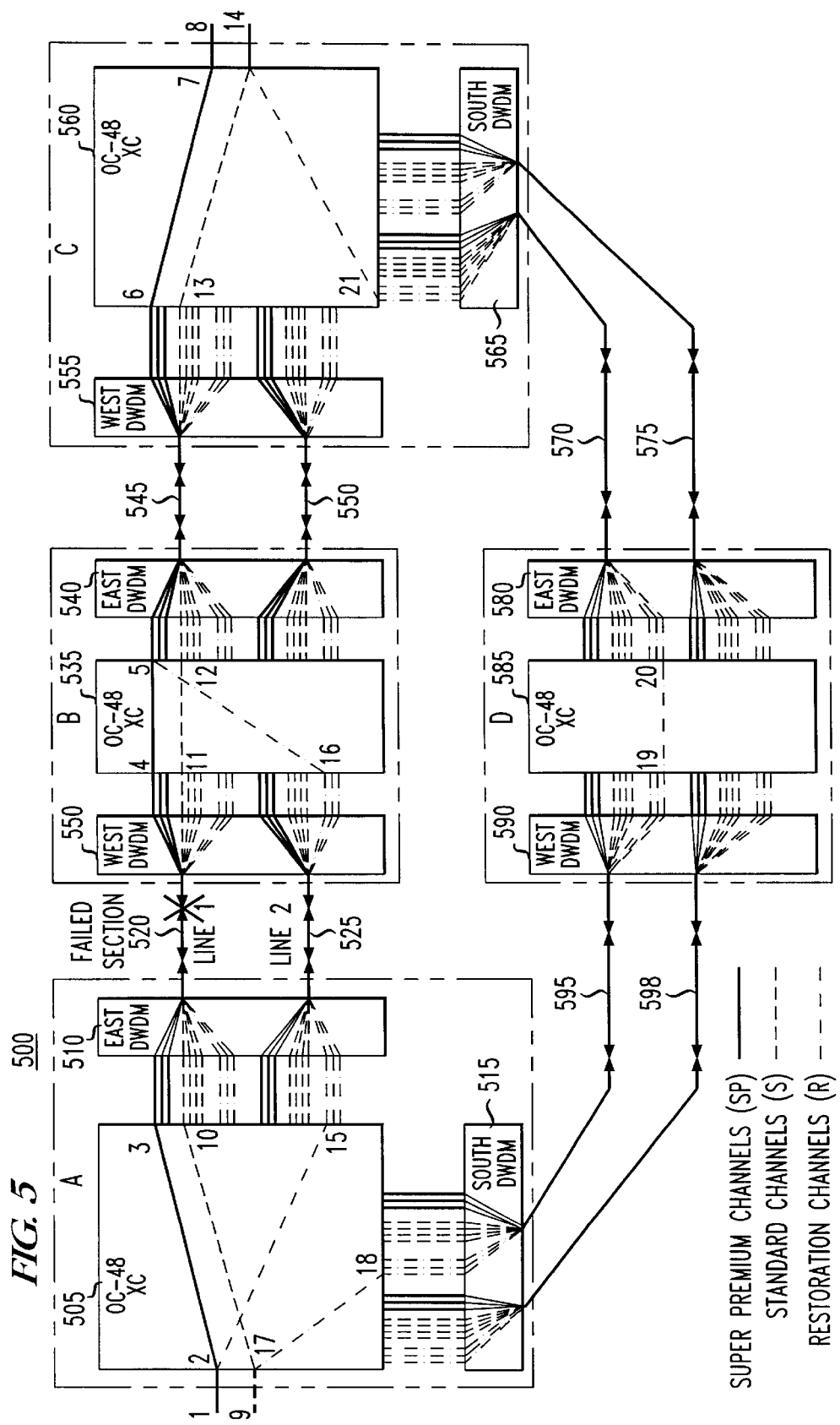
FIG. 5 is illustrates an embodiment of the present invention showing a representative hybrid protection architecture for an optical communication system having a single failure
Figure 6:
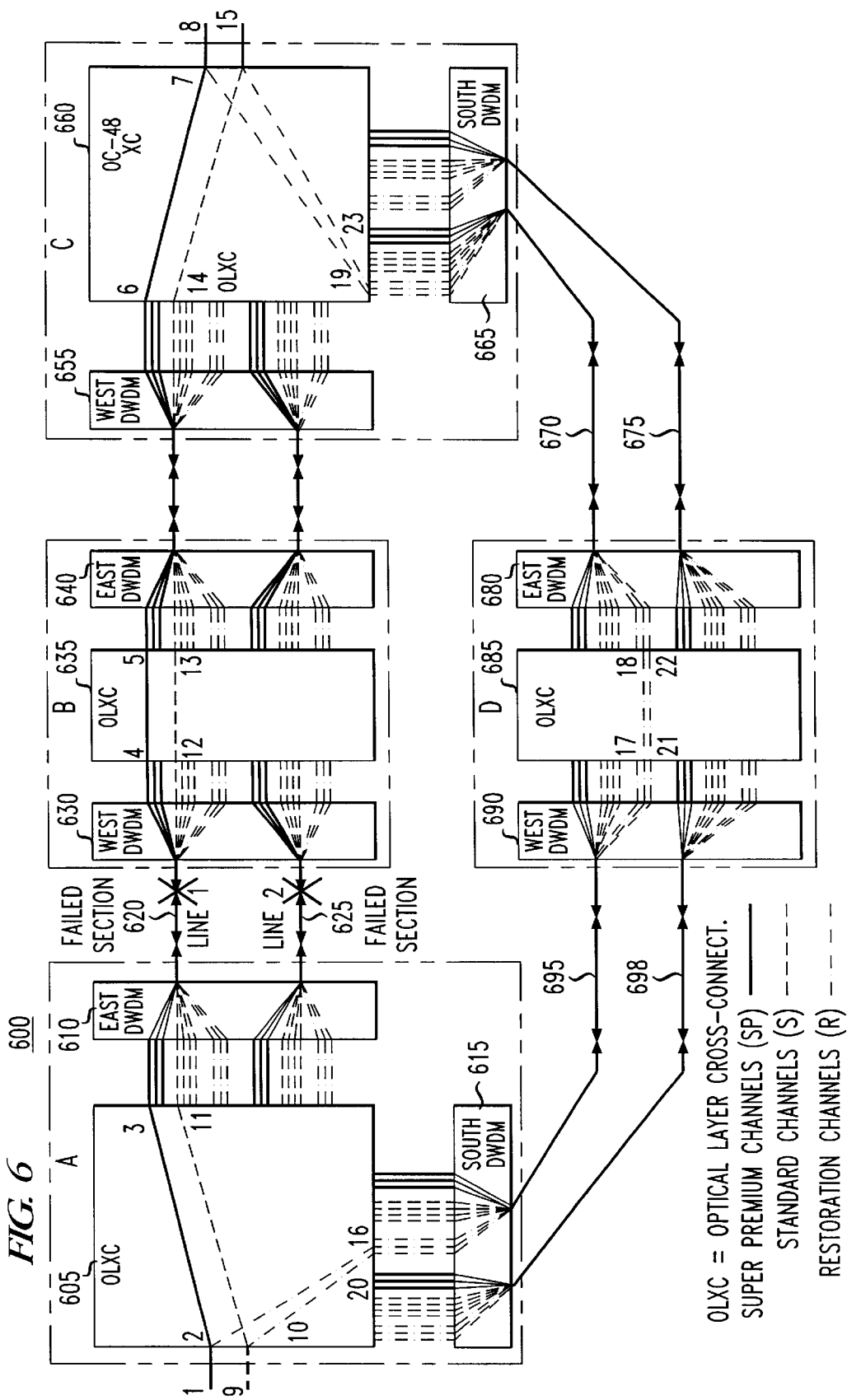
FIG. 6 illustrates an embodiment of the present invention showing a representative hybrid protection architecture for an optical communication system having multiple failures

In reference to FIG. 5 and FIG. 6, optical fiber communication systems 500, 600 using a representative hybrid protection architecture (HPA) in accordance with the present invention are shown. The systems 500, 600 comprise a plurality of. interconnected (linked) nodes A, B, C, D. It is noted that nodes A, B, C, D are shown as a representative number of nodes and the invention is not limited to this particular number of nodes. The HPA uses a multiple-line optical fiber connection for each link between nodes, but the protection scheme is not 1:1.

Particularly, in FIG. 5, optical fiber communication system 500 uses the representative HPA for a single interface (line) failure between node A and node B. The system 500 includes optical layer cross-connect switches (OLXC) 505, 535, 560, 585 for each node A, B, C, D respectively. For both FIGS. 5 and 6, generally the OLXC can provide a plurality of functions as needed by particular communication applications. This functionality includes, but is not limited to functioning as a primarily optical domain switch wherein optical communication signals switched by the OLXC do not undergo any conversion to the electrical domain, or functioning as an optical switch including optical and electrical components for any necessary conversion (optical-to-electrical or electrical-to-optical) of the switched optical communication signals.

Referring again to FIG. 5, nodes A, B, C, D comprise interface equipment (IEs) 510, 515, 530, 540, 555, 565, 580, 590 with at least two IEs for each node A, B, C, D respectively. At every node, each IE includes at least two pairs of interface ports wherein one port in each pair is used for interconnecting the IE to the OLXC while the other port in each pair interconnects the IE to another IE at a different node. The IEs are interconnected to the OLXCs, via OLXC equipment cards at the OLXC end and the interface ports at the IE end, through a pair of optical fibers for carrying bi-directional traffic (e.g., OC-48 or OC-192 channels) or through electrical lines using optical-to-electrical transducers. Advantageously, the IEs comprise wavelength division multiplexers (WDM), preferably dense wavelength division multiplexers (DWDM).

Each IE includes a two-line optical fiber connection (link), via the interface ports, to a separate node in the system 500 wherein lines 520, 525 connect IEs 510, 530 for link AB, lines 545, 550 connect IEs 540, 555 for link BC, lines 570, 575 connect IEs 565, 580 for link CD, and lines 595, 598 connect IEs 515, 590 for link AD. The line connections preferably comprise a single or multiple fiber (cable bundle of fibers) connection between nodes.

As shown in FIGS. 5 and 6 and the accompanying legends, each line, interconnected to the optical layer cross-connect switch at each node, carries multiple channel groups using the DWDMs. These channel groups preferably include super premium channels (SP), standard channels (S), and restoration channels (R). Both SP and S channels are traffic-carrying (revenue generating) channels carrying high-speed traffic (e.g., OC-48, OC-192) within the system which are protected and restored against failures using the R channels. R channels are channels of equivalent capacity to SP and S channels that are used to restore communication services carried by SP and S in response to failures in these channels. These failures include, but are not limited to single channel failures, optical amplifier failures, transmitter and receiver failures, interface port failures, and fiber cuts occurring on the optical fiber channel connection between nodes. Also, R channels carry communication services that can be pre-empted in response to a SP or S channel failure.

In both FIGS. 5 and 6, the OLXC switches the channels in event of failure. Generally, any network fault detection technique may be used to trigger the restoration switching. These techniques include, but are not limited to loss of signal (LOS), loss of frame (LOF), signal degradation (SD). The fault detection technique can be carried out in either the electrical or optical domain. The fault detection techniques in the optical domain can include, but are not limited to optical power loss, optical time domain reflectometer (OTDR) measurements, loss of pilot tone, or use of a dedicated port and/or wavelength.

The channel switching may occur under the control of any appropriate control system including, but not limited to an OLXC controller (not shown) or a network operations center (not shown). An advantageous control system that may be used with the present invention is described in the commonly-assigned U.S. patent application Ser. No. 08/936, 369 (Chaudhuri) which is herein-incorporated by reference. Chaudhuri particularly describes a computer-based automatic restoration methodology.

The control system may reside locally at one of the plurality of nodes A, B, C, D or be remotely located and connect with one of the nodes A, B, C, D wherein both cases the control system is interconnected to all the other nodes via data links embedded in the connections between nodes or via external data links. The data link network may advantageously comprise a Digital Communication Network (DCN) and/or a Network Operations System (NOS) which provides an ultra-reliable data network for communicating status signaling messages (e.g., alarm signals) between nodes regarding system operation, faults, etc. Also, for better reliability a redundant control system may be provided at another location or alternatively the control system may be provided at each node.

The control system can include a system processor for monitoring OLXC switch states and issuing switch commands. It would be apparent to one skilled in art how to design specific software and/or hardware implementations for addressing, monitoring, and controlling an OLXC based on the number of ports and switch configurations.

Referring to FIG. 5, an illustrative example is described. In response to a single interface failure occurring on an SP or S channel carried by line 520 between nodes A and B, the OLXC 505 switches the channel to an R channel on the other line 525 connecting nodes A and B. The single interface failure could comprise an OC-48 interface on the optical layer cross-connect switch 505 or an optical transmitter or receiver failure on the path of an SP or S channel on line 520.

In an alternate example, the entire line 520 fails due to optical amplifier failure, a fiber cut, or some other line failure. In response to the failure, the SP channels carried on line 520 are switched by OLXC 505 to the R channels of the other line 525 linking nodes A and B. With reference to FIG. 5, the SP channel (—) carrying service 1-2-3-4-5-6-7-8 through link ABC on line 520 is switched by QLXC 505 on to R channels on line 525 such that the restored path becomes 1-2-15-16-5-6-7-8 for link ABC.

However, in response to a similar line failure, S channels carried on the failed line 520 are switched in a different manner to restore traffic carried by these channels. The S channels are restored from the end nodes of the channel path. The S channel (----) carrying service 9-17-10-11-12-13-14 through link ABC on line 520 is switched by OLXC 505 on to R channels on line 595 through link ADC such that the restored path becomes 9-17-18-19-20-21-14. This S channel restoration process can be advantageously implemented using the automatic restoration scheme described in the previously mentioned Chaudhuri application.

FIG. 6 shows an optical fiber communication system 600 using an HPA when a failure occurs on both optical fiber lines 620, 625 between nodes A, B. The system 600 includes OLXCs 605, 635, 660, 685 for each node A, B, C, D respectively. Nodes A, B, C, D comprise IEs 610, 615, 630, 640, 655, 665, 680, 690 with at least two IEs for each node A, B, C, D respectively. Again, at every node, each IE includes at least two pairs of interface ports wherein one port in each pair is used for interconnecting the IE to the OLXC while the other port in each pair interconnects the IE to another IE at a different node. The IEs are interconnected to the OLXCs, via OLXC equipment cards at the OLXC end and the interface ports at the IE end, through a pair of optical fibers for carrying bi-directional traffic (e.g., OC-48 or OC-192 channels) or through electrical lines using optical-to-electrical transducers. Advantageously, the IEs comprise wavelength division multiplexers (WDM), preferably dense wavelength division multiplexers (DWDM).

Each IE includes a two-line optical fiber connection (link), via the interface ports, to a separate node in the system 600 wherein lines 620, 625 connect IEs 610, 630 of nodes A, B respectively, lines 645, 650 connect IEs 640, 655 of nodes B, C respectively, lines 670, 675 connect IEs 665, 680 of nodes C, D respectively, and lines 695, 698 connect IEs 615, 690 of nodes A, D respectively. The line connections preferably comprise a single or multiple fiber pairs (cable bundle) connection between nodes.

Figure 1:
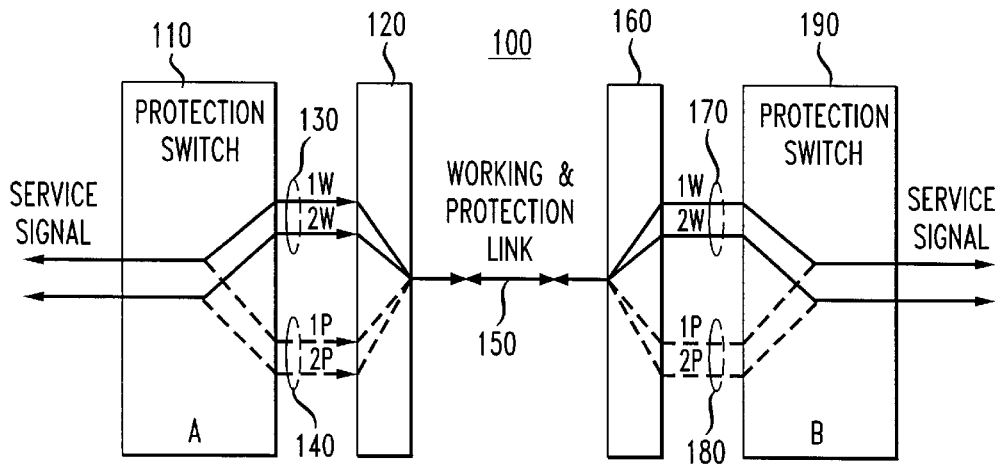
FIG. 1 is a block diagram of a one-line 1:1 protection architecture for a known optical communication system.
Figure 2:
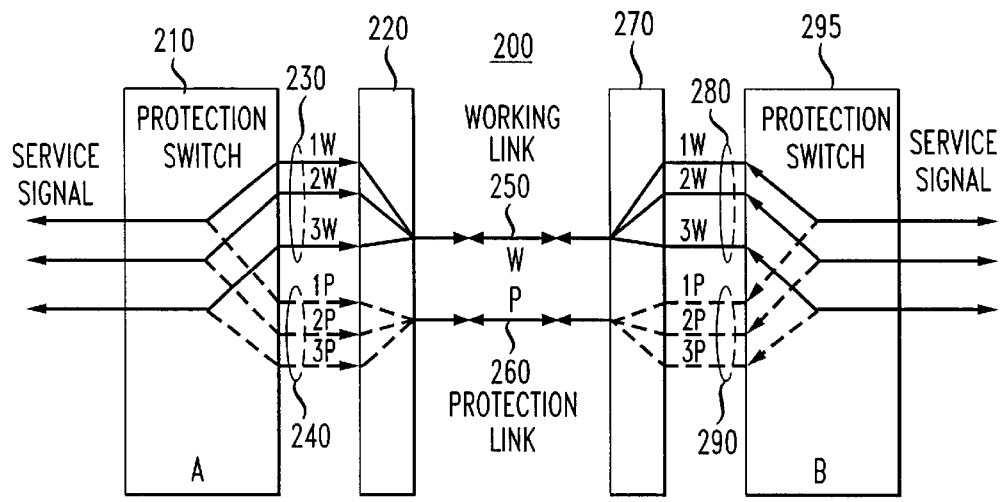
FIG. 2 is a block diagram of a two-line 1:1 protection architecture for a known optical communication system.
Figure 3:
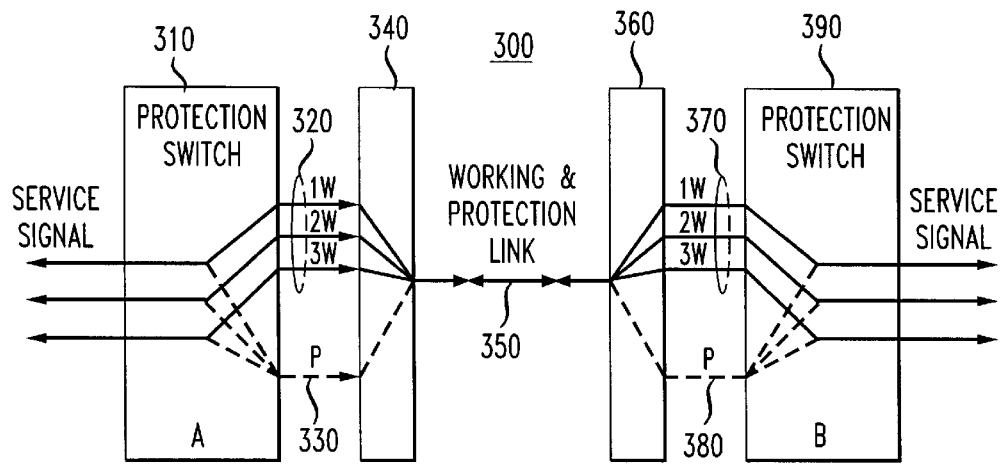
FIG. 3 is a block diagram of a one-line 1:N protection architecture for a known optical communication system.
Figure 4:
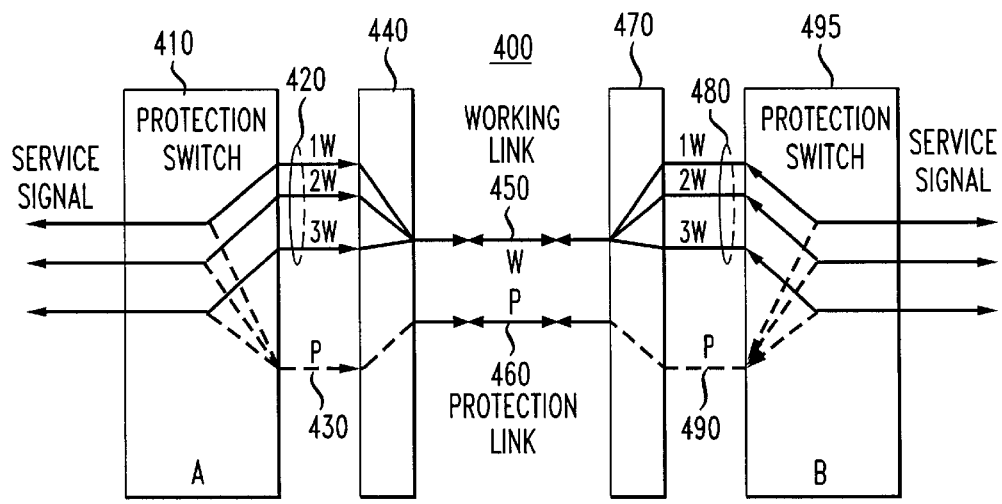
FIG. 4 is a block diagram of a two-line 1:N protection architecture for a known optical communication system.

With reference to FIG. 3(b), another illustrative example is described. In response to both lines 620, 625 on link AB failing due to a fiber cut, both the SP and the S channels are restored from the end nodes of the channel path. The SP channel (—) carrying service 1-2-3-4-5-6-7-8 through link ABC on line 620 is switched by OLXC 605 on to R channels on line 695 through link ADC such that the restored path becomes 1-2-16-17-18-19-8. Also, the S channel (----) carrying service 9-10-11-12-13-14-15 through link ABC on line 620 is switched by OLXC 605 on to R channels on line 698 through link ADC such that the restored path becomes 9-10-20-21-22-23-15. Again, this end node channel restoration process can be advantageously implemented using the automatic restoration scheme described in Chaudhuri.

In this HPA protection scheme, system planning and management helps ensure restoration channel availability. Channel assignment of SP, S, and R channels in each line forming the internodal link are reciprocal to each other. The number of SP channels in one line must be equal to the number of R channels in the other line. The remaining channels are assigned as S channels provided there are sufficient R channels in each link of the network to guarantee 100% restoration of all SP channels when there is a line failure anywhere in the network.

This HPA restoration scheme effectively offers at least two grades of service (at least two priority levels for restoration). The communication services carried by the SP channels are as reliable or given as high a restoration priority level as the communication services carried by the two-line 1:1 protection scheme previously described. Also, the S channel communication services are as reliable or given as high a restoration priority level as the communication services carried by the one-line 1:1 or 1:N protection schemes described previously.

Also, the present invention has greater capacity than an optical transport system using the two-line 1:1 protection scheme assuming not all channel services require the same amount of reliability. A particular example can be used to demonstrate this capacity gain. Assuming DWDM system channel capacity of 80 channels per line, approximately 60% of all channels (total of SP and S) on a link can be designated as reserved to guarantee restoration of all working traffic against a line failure in any link in the network. Therefore, 30 channels per line are left to be designated as R channels. Of the remaining 50 channels, 30 can be designated as SP channels and 20 as S channels. Therefore, for every two-line link, there are 60 SP channels, 40 S channel used for revenue-generating traffic with two grades of service reliability (two priority levels for restoration). Each grade or priority level is protected against equipment failures as well as fiber cuts. The HPA carries a total of 100 working channels on the two-line link as compared to 80 working channels in the two-line 1:1 protection scheme since no protection capacity is used for revenue-generating traffic in the two-line 1:1 scheme. Therefore, the present invention provides a capacity-efficient architecture resulting in a 25% gain of highly reliable revenue-generating capacity. The 60 R channels in the two DWDM lines can still be used for low-priority traffic that may be preempted in response to failure of SP and S traffic.

The present invention provides several advantages to service providers of optical communication services. The hybrid protection architecture described herein enables a reliable optical communications network that provides varying grades of communication services while improving idle capacity utilization when restoring communication services on alternate optical fiber communication paths in the network.

Although the invention is described herein primarily using a mesh topology example utilizing DWDM, it will be appreciated by those skilled in the art that modifications and changes may be made without departing from the spirit and scope of the present invention. As such, the method and apparatus described herein may be equally applied to any optical communication system topology comprising a plurality of nodes utilizing any other architecture.

What is claimed is:

1. An optical fiber communication system, comprising:
   a plurality of nodes interconnected by optical fibers, each node including an optical layer cross-connect switch interconnected to at least two interface elements, each interface element including at least two optical fiber connections, and each interface element connecting to a separate node via said at least two optical fiber connections;
   each said optical fiber connection including at least three channel groups, at least one channel group including predetermined channels allocated for restoring communication in response to a failure occurring in one of said optical fiber connections, and at least two channel groups including predetermined channels allocated for carrying user traffic;

said optical switch being enabled for switching at least a portion of said channel groups from a first optical fiber connection to a second optical fiber connection in response to a failure occurring in the first optical fiber connection, the second optical fiber connection being enabled for carrying the same or greater capacity of information as carried by said portion of switched channel groups in the first optical fiber connection;

said channel groups including priority levels for switching said channel groups to a second optical fiber connection in response to a failure occurring in a first optical fiber connection carrying said channel groups;

wherein said priority levels including at least a highest priority level and a second highest priority level; and said optical switch being enabled for switching at least a portion of said highest priority channel group to at least a portion of said restoration channels within a second optical fiber connection in response to a failure occurring in a first optical fiber connection carrying said portion of highest priority channel group.

2. The system of claim 1, wherein:

said highest priority level being assigned to a super premium channel group, and a second highest priority level being assigned to a standard channel group.

3. The system of claim 1, wherein:

said interface elements are wave division multiplexers.

4. The system of claim 1, wherein:

said restoration channel group being enabled for carrying pre-emptable user traffic.

5. The system of claim 1, wherein:

said system having a mesh configuration.

6. The system of claim 1, wherein:

said failure is an interface element failure, optical fiber failure, an optical amplifier failure, or an optical transceiver failure.

7. The system of claim 1, wherein:

said switching to the second optical fiber connection results in a capacity gain for said higher priority channel groups.

8. An optical fiber communication system, comprising:

a plurality of nodes interconnected by optical fibers, each node including an optical layer cross-connect switch interconnected to at least two interface elements, each interface element including at least two optical fiber connections, and each interface element connecting to a separate node via said at least two optical fiber connections;

each said optical fiber connection including at least three channel groups, at least one channel group including predetermined channels allocated for restoring communication in response to a failure occurring in one of said optical fiber connections, and at least two channel groups including predetermined channels allocated for carrying user traffic;

said optical switch being enabled for switching at least a portion of said channel groups from a first optical fiber connection to a second optical fiber connection in response to a failure occurring in the first optical fiber connection, the second optical fiber connection being enabled for carrying the same or greater capacity of information as carried by said portion of switched channel groups in the first optical fiber connection;

said channel groups including priority levels for switching said channel groups to a second optical fiber connection in response to a failure occurring in a first optical fiber connection carrying said channel groups;

wherein said priority levels including at least a highest priority level and a second highest priority level;

said optical switch being enabled for switching at least a portion of said highest priority channel group to at least a portion of said restoration channels within a second optical fiber connection in response to a failure occurring in a first optical fiber connection carrying said portion of highest priority channel group, and said optical switch being further enabled for switching at least a portion of said second highest priority channel group to at least a portion of said restoration channels within a second optical fiber connection in response to a failure occurring in a first optical fiber connection carrying said portion of second highest priority channel group.

9. The system of claim 8, wherein:

said highest priority level being assigned to a super premium channel group, and a second highest priority level being assigned to a standard channel group.

10. The system of claim 8, wherein:

said interface elements are wave division multiplexers.

11. The system of claim 8, wherein:

said restoration channel group being enabled for carrying pre-emptable user traffic.

12. The system of claim 8, wherein:

said system having a mesh configuration.

13. The system of claim 8, wherein:

said failure is an interface element failure, optical fiber failure, an optical amplifier failure, or an optical transceiver failure.

14. The system of claim 8, wherein:

said switching to the second optical fiber connection results in a capacity gain for said higher priority channel groups.

* * * * *